United States Patent
Uematsu et al.

(10) Patent No.: US 10,301,438 B2
(45) Date of Patent: May 28, 2019

(54) DISPERSION LIQUID USED FOR FORMING POROUS FILM, POROUS FILM, POWER STORAGE ELEMENT, AND METHOD FOR PRODUCING POROUS FILM

(71) Applicant: TOKYO OHKA KOGYO CO., LTD., Kawasaki-shi (JP)

(72) Inventors: Teruhiro Uematsu, Kawasaki (JP); Takeshi Hikima, Kawasaki (JP)

(73) Assignee: TOKYO OHKA KOGYO CO., LTD., Kawasaki-Shi (JP)

( * ) Notice: Subject to any disclaimer, the term of this patent is extended or adjusted under 35 U.S.C. 154(b) by 0 days.

(21) Appl. No.: 15/952,839

(22) Filed: Apr. 13, 2018

(65) Prior Publication Data

US 2018/0298152 A1 Oct. 18, 2018

(30) Foreign Application Priority Data

Apr. 18, 2017 (JP) .................................. 2017-082398

(51) Int. Cl.
| | |
|---|---|
| *H01M 2/16* | (2006.01) |
| *C08J 3/09* | (2006.01) |
| *B01D 71/12* | (2006.01) |
| *H01M 2/14* | (2006.01) |
| *C08J 9/28* | (2006.01) |
| *H01M 10/0525* | (2010.01) |

(52) U.S. Cl.
CPC .............. *C08J 3/095* (2013.01); *B01D 71/12* (2013.01); *C08J 9/28* (2013.01); *H01M 2/145* (2013.01); *H01M 2/1626* (2013.01); *H01M 2/1673* (2013.01); *H01M 10/0525* (2013.01); *C08J 2201/0502* (2013.01); *C08J 2301/04* (2013.01)

(58) Field of Classification Search
CPC ...... H01M 2/14; H01M 2/145; H01M 2/1626; H01M 10/0525
USPC .................. 427/115; 429/247, 249
See application file for complete search history.

(56) References Cited

U.S. PATENT DOCUMENTS

| | | | | |
|---|---|---|---|---|
| 2,724,011 A | * | 11/1955 | Strauss ............... | H01M 2/1653 427/115 |
| 4,279,979 A | * | 7/1981 | Benson .................... | D21H 5/20 429/254 |
| 6,159,634 A | * | 12/2000 | Yen ...................... | H01M 2/1666 428/532 |
| 8,765,308 B2 | | 7/2014 | Machii et al. | |
| 2004/0234862 A1 | * | 11/2004 | Macglashan ........ | H01M 2/1626 429/247 |
| 2013/0280616 A1 | | 10/2013 | Machii et al. | |
| 2016/0038884 A1 | * | 2/2016 | Hikita .................. | C09D 133/04 210/500.23 |
| 2016/0190534 A1 | | 6/2016 | Kimura et al. | |

FOREIGN PATENT DOCUMENTS

| | | |
|---|---|---|
| JP | 2008-274525 A | 11/2008 |
| JP | 2013-251236 | * 12/2013 |
| JP | 2016-126998 | 7/2016 |
| WO | WO 2013/054889 A1 | 4/2013 |

OTHER PUBLICATIONS

Notification of Reasons for Refusal issued in Japanese Patent Application No. 2017-082398, dated Sep. 26, 2017.
Office Action issued in Korean Patent Application No. 10-2018-0044506, dated Aug. 31, 2018.

* cited by examiner

*Primary Examiner* — Brian K Talbot
(74) *Attorney, Agent, or Firm* — Knobbe, Martens, Olson & Bear LLP

(57) ABSTRACT

A dispersion liquid including a fiber material which is capable of forming a porous film having high porosity; a porous film formed using the dispersion liquid; a power storage element including the porous film; and a method for producing a porous film using the dispersion liquid. In the dispersion liquid including the fiber material and an organic solvent, which is used for forming a porous film by applying and drying, the fiber material contains a predetermined amount of a modified cellulose fiber including a carboxy group or a metal salt thereof, and the amount of water in the dispersion liquid is 5% by mass or less.

12 Claims, No Drawings

DISPERSION LIQUID USED FOR FORMING POROUS FILM, POROUS FILM, POWER STORAGE ELEMENT, AND METHOD FOR PRODUCING POROUS FILM

This application claims priority to Japanese Patent Application No. 2017-082398, filed Apr. 18, 2017, the entire content of which is incorporated herein by reference.

BACKGROUND OF THE INVENTION

Field of the Invention

The present invention relates to a dispersion liquid to be used for forming a porous film, a porous film formed by using the dispersion liquid, a power storage element including the porous film, and a method for producing a porous film using the dispersion liquid.

Related Art

Conventionally, various porous films have been used for a filter and the like. Furthermore, in recent years, application of porous films to separators for secondary batteries such as a lithium battery has been progressed.

As a porous film to be used as a separator, for example, a porous film obtained by forming a coating film using an aqueous dispersion liquid of a modified cellulose fiber and drying the formed coating film has been proposed, wherein the modified cellulose fiber is obtained by oxidizing cellulose fiber in water and includes a predetermined amount of a carboxy group (see Patent Document 1).

Patent Document 1: Japanese Unexamined Patent Application, Publication No. 2013-251236

SUMMARY OF THE INVENTION

When a porous film is formed using the dispersion liquid described in Patent Document 1, when a modified cellulose fiber is satisfactorily dispersed in the dispersion liquid, a porous film having a pore diameter that is small to some extent can be formed, but it tends to be difficult to form a porous film having high porosity. Therefore, methods for forming a dispersion liquid and a porous film, which are capable of satisfactorily dispersing a fiber material and of forming a porous film having high porosity, are required.

The present invention has been made in view of the above-mentioned problems, and an object of the present invention is to provide a dispersion liquid including a (A) fiber material dispersed satisfactorily and stably and being capable of forming a porous film having high porosity, a porous film formed using the dispersion liquid, a power storage element including the porous film, and a method for producing a porous film using the dispersion liquid.

The present inventors have found that the above-mentioned problems can be solved when, in a dispersion liquid which is used for forming a porous film by applying and drying and includes a (A) fiber material and an (B) organic solvent, a modified cellulose fiber including a predetermined amount of a carboxy group or a metal salt thereof is contained in the (A) fiber material, and the amount of water in the dispersion liquid is set to a predetermined amount or less, and they have completed the present invention.

In other words, a first embodiment of the present invention is a dispersion liquid to be used for forming a porous film,
the forming of the porous film including:
a step of applying a dispersion liquid to a base material so as to form a coating film, and
a step of drying the coating film,
in which the dispersion liquid includes a (A) fiber material and an (B) organic solvent,
the (A) fiber material includes a modified cellulose fiber at least a part of which is oxidized,
the modified cellulose fiber includes 0.1 mmol/g or more and 3.0 mmol/g or less of a carboxy group or a metal salt thereof, and
an amount of water with respect to the total amount of the dispersion liquid is 5% by mass or less.

Furthermore, a second embodiment of the present invention is a porous film obtained by drying a coating film including a dispersion liquid according to the first embodiment.

Furthermore, a third embodiment of the present invention is a power storage element including a porous film according to the second embodiment.

Furthermore, a fourth embodiment of the present invention is a method for producing a porous film, the method including: a step of oxidizing a (A) fiber material including a cellulose fiber so as to prepare a modified cellulose fiber in which at least a part of the cellulose fiber is oxidized;
a step of preparing a dispersion liquid by mixing a (A) fiber material including the modified cellulose fiber with an (B) organic solvent;
a step of applying the dispersion liquid to a base material so as to form a coating film; and
a step of drying the coating film so as to form a porous film, wherein the modified cellulose fiber includes 0.1 mmol/g or more and 3.0 mmol/g or less of a carboxy group or a metal salt thereof, and
an amount of water with respect to the total amount of the dispersion liquid is 5% by mass or less.

The present invention can provide a dispersion liquid including a (A) fiber material dispersed satisfactorily and stably and being capable of forming a porous film having high porosity, a porous film formed using the dispersion liquid, a power storage element including the porous film, and a method for producing a porous film using the dispersion liquid.

DETAILED DESCRIPTION OF THE INVENTION

<<Dispersion Liquid Used for Forming Porous Film>>

A dispersion liquid used for forming a porous film of this exemplary embodiment is used for forming a porous film including the below-mentioned (A) fiber material. The formation of a porous film using the above-mentioned dispersion liquid includes a step of applying the dispersion liquid to a base material so as to form a coating film, and a step of drying the coating film. Hereinafter, in the specification of the present application, unless otherwise particularly described, a "dispersion liquid" is a "dispersion liquid used for forming a porous film."

The dispersion liquid includes a (A) fiber material and an (B) organic solvent. Furthermore, the (A) fiber material includes a modified cellulose fiber at least a part of which is oxidized. The modified cellulose fiber includes 0.1 mmol/g or more and 3.0 mmol/g or less of a carboxy group or a metal salt thereof. An amount of water with respect to the total amount of the dispersion liquid is 5% by mass or less. When the dispersion liquid includes the above-mentioned specific modified cellulose fiber and the amount of water in the dispersion liquid is 5% by mass or less, the (A) fiber material is dispersed satisfactorily and stably in the dispersion liquid, and a porous film having high porosity can be easily formed using the dispersion liquid.

The viscosity of the dispersion liquid at room temperature (20° C.) is preferably 5 cp or more and 500 cp or less, more preferably 10 cp or more and 400 cp or less, further preferably 30 cp or more and 300 cp or less, and particularly preferably 50 cp or more and 200 cp or less. The viscosity of the dispersion liquid can be measured by using an E-type viscometer. When the viscosity of the dispersion liquid is within the above-mentioned range, the coating characteristics of the dispersion liquid are satisfactory, the (A) fiber material is dispersed satisfactorily in the dispersion liquid, and the dispersion stability of the (A) fiber material is satisfactory. The viscosity of the dispersion liquid can be adjusted by adjusting the solid content concentration of the dispersion liquid, changing the types of (B) organic solvents, and adjusting the dispersion diameter of the (A) fiber material in dispersion liquid. Furthermore, in a scope in which a remarkably adverse effect is not produced in a porous film formed using a dispersion liquid, the viscosity of the dispersion liquid may be adjusted by adding a well-known viscosity adjusting agent to the dispersion liquid.

The zeta potential of a surface of the (A) fiber material in the dispersion liquid is preferably −80 mV or more and −20 mV or less, more preferably −70 mV or more and −25 mV or less, and particularly preferably −60 mV or more and −30 mV or less. When the zeta potential of the surface of the (A) fiber material in the dispersion liquid is in the above-mentioned range, aggregation of the (A) fiber material does not easily occur in the dispersion liquid, and a porous film having a desired pore diameter can be easily formed. A method for adjusting the zeta potential is not particularly limited, and examples of the method include addition of an ionic substance into a dispersion liquid, controlling a particle diameter of a (A) fiber material, and the like.

Hereinafter, formation of a porous film as a method of using a dispersion liquid, essential or arbitrary components included in the dispersion liquid, and a method for preparing the dispersion liquid will be described.

<Formation of Porous Film>

As mentioned above, formation of a porous film using a dispersion liquid includes a step of applying a dispersion liquid to a base material so as to form a coating film, and a step of drying the coating film.

The base material is not particularly limited as long as a dispersion liquid can be applied to the base material. Examples of the base material include a film, a sheet, a substrate, and the like, including glass, metal, resin such as polyethylene terephthalate and polycarbonate, and the like. As mentioned later, a porous film formed by using a dispersion liquid is preferably used as a separator in a power storage element. In this case, the base material is an electrode, and more specifically, an electrode for a power storage element. In this way, when a porous film is formed by applying a dispersion liquid to form an electrode surface, a separator attached to the surface of the electrode is formed as the porous film, and an electrode composite of the electrode and the separator is obtained. The electrode may be a positive electrode or a negative electrode.

Devices to be used for application of a dispersion liquid are not particularly limited. Examples of the devices for application include a contact transfer type applicator such as a roll coater, a reverse coater, or a bar coater, or a non-contact type applicator such as curtain flow coater, a die coater, a slit coater, and a spray. Even when a surface of a base material of an electrode has concavity and convexity, the dispersion liquid of this exemplary embodiment can be used. In this way, when the surface of the base material has concavity and convexity, a method using a spray, for example, a rotary atomization type applicator, is preferably used as the applying method because a coating film having a uniform film thickness can be formed easily. As the rotary atomization type applicator, for example, a device described in Japanese Unexamined Patent Application, Publication No. 2013-115181 can be used.

A film thickness of the coating film is not particularly limited, and it can be appropriately adjusted in consideration of a film thickness of the finally obtained porous film. Preferable film thickness of the porous film is mentioned later.

Next, the coating film formed by the above-mentioned method is dried to remove an (B) organic solvent or the like from the coating film. The drying method is not particularly limited but a method of heating a coating film on a base material such as an electrode is preferable. Heating of a coating film may be carried out under atmospheric pressure, or may be carried out under reduced pressure. The heating temperature is not particularly limited, and is appropriately set within a temperature range in which a porous film is not thermally deteriorated, in consideration of the boiling point of the (B) organic solvent.

<(A) Fiber Material>

(A) Fiber material includes a modified cellulose fiber at least a part of which is oxidized. Thus, the (A) fiber material can be satisfactorily dispersed in a dispersion liquid, dispersion stability of the dispersion liquid is satisfactory, and a porous film including an opening having a preferably small pore diameter can be formed using the dispersion liquid.

The (A) fiber material may include fibers other than the modified cellulose fiber as long as the (A) fiber material includes the modified cellulose fiber mentioned above. Fibers other than the modified cellulose may be inorganic fiber or organic fiber.

Suitable examples of the inorganic fiber include microglass (small-diameter glass fiber), rock wool, and the like. Suitable examples of the organic fiber include cellulose fiber materials including non-modified cellulose fibers, cellulose esters such as carboxymethyl cellulose and cellulose acetate, and lignocellulose, neutral mucopolysaccharide fiber materials such as chitin and chitosan, synthetic resin fiber materials of resins including polyamides such as aliphatic nylon and aromatic nylon (aramid), polyolefins such as polyethylene and polypropylene, vinylon, polyester, polyimide, polyamide-imide, and polyvinylidene fluoride. For the synthetic resin fiber material, for example, fine fibers can be obtained by a method such as electric field spinning (electrospinning).

The content of the modified cellulose fiber in the (A) fiber material is preferably 70% by mass or more, more preferably 80% by mass or more, further preferably 90% by mass or more, particularly preferably 95% by mass or more, and most preferably 100% by mass.

The volume average particle diameter of the (A) fiber material in the dispersion liquid is not particularly limited. From the viewpoint that the (A) fiber material is easily dispersed satisfactorily in the dispersion liquid and the viewpoint that a porous film having a desired porosity and/or a desired average pore diameter can be easily formed, the volume average particle diameter is preferably 5 μm or more and 100 μm or less, more preferably 5 μm or more and 70 μm or less, further preferably 5 μm or more and 50 μm or less, particularly preferably 5 µm or more and 30 µm or less, and most preferably 5 µm or more and 20 µm or less.

The number average fiber diameter of the (A) fiber material in the dispersion liquid is preferably 2 nm or more and 500 nm or less, more preferably 2 nm or more and 100 nm or less, and particularly preferably 3 nm or more and 80 nm or less. When the number average fiber diameter of the (A) fiber material is within the above-mentioned range, the (A) fiber material is easily dispersed in the dispersion liquid stably and satisfactorily, and a porous film having a desired porosity and/or a desired average pore diameter can be easily formed using the dispersion liquid. The maximum fiber diameter of the (A) fiber material in the dispersion liquid is preferably 1000 nm or less and more preferably 500 nm or less. When the maximum fiber diameter of the (A) fiber material is in the above-mentioned range, the (A) fiber material is not easily precipitated in the dispersion liquid, and the (A) fiber material is stably dispersed in the dispersion liquid.

The number average fiber diameter and the maximum fiber diameter of the (A) fiber material in the dispersion liquid can be measured by, for example, the following method. First, the solid content concentration of the dispersion liquid is adjusted to 0.05% by mass or more and 0.1% by mass or less by dilution or concentration as necessary. The dispersion liquid whose solid content concentration has been adjusted is cast on a carbon film-coated grid which has been subjected to hydrophilic treatment to make a test sample for observation under a transmission electron microscope (TEM). Note here that when the dispersion liquid includes a fiber having a large fiber diameter, a scanning electron microscope (SEM) image of a surface that is cast on a glass may be observed. Then, observation is carried out using electron microscope images acquired at a magnification of 5000 times, 10,000 times or 50,000 times depending on the size of constituent fibers. The sample and the observation conditions (such as the magnification) are adjusted so that at least 20 fibers intersect axes when vertical and horizontal axes having an arbitrary image width are assumed in the image obtained by observation under the electron microscope. After observation images that satisfy these conditions are observed, two vertical axes and two horizontal axes are drawn arbitrarily on a single observation image, and the fiber diameters of fibers that cross the axes are read visually. At least three images of non-overlapping portions of the surface are photographed using an electron microscope in this manner, and the values of the fiber diameters of fibers that cross two axes in the respective images are measured (therefore, fiber diameter information of a minimum of "20 fibers×2×3=120 fibers" is obtained). The maximum fiber diameter and the number average fiber diameter are calculated based on the data of the thus obtained fiber diameter.

When a thermogravimetric reduction curve obtained by thermogravimetry (TG) is analyzed, it is preferable that the (A) fiber material satisfies predetermined conditions. Specifically, when the (A) fiber material was subjected to thermogravimetry under the conditions in which a starting temperature is room temperature (20° C.) and a temperature increasing speed is 10° C./min, it is preferable that a weight reduction rate at a time point when the temperature reaches 190° C. is 10% or less, and a weight reduction rate at a time point when the temperature reaches 340° C. is 65% or more. In the above-mentioned conditions, the weight reduction rate at a time point when the temperature reaches 190° C. is preferably 10% or less, more preferably 8% or less, and particularly preferably 5% or less. Furthermore, in the above-mentioned conditions, the weight reduction rate at a time point when the temperature reaches 340° C. is preferably 65% or more, more preferably 70% or more, and particularly preferably 72% or more. When the weight reduction rate at a time point when the temperature reaches 190° C. is in the above-mentioned range, a porous film having an opening with a desired pore diameter is easily formed. This is assumed to be because the amount of cellulose having a low crystallization degree in the (A) fiber material tends to be limited. Also when the weight reduction rate at a time point when the temperature reaches 340° C. is in the above-mentioned range, a porous film having an opening with a desired pore diameter is easily formed. This is assumed to be because the amount of components that inhibit the formation of pores, for example, hemicellulose, lignin, and the like, in the (A) fiber material tends to be increased.

Examples of the method of adjusting the weight reduction rate in a predetermined temperature range in the thermogravimetric reduction curve to the above-mentioned range include a method of purifying the (A) fiber material according to a well-known method, and a method using a modified cellulose fiber produced using a highly purified cellulose fiber as the (A) fiber material.

[Modified Cellulose Fiber]

A modified cellulose fiber is a fiber in which at least a part of a non-modified cellulose fiber is oxidized. In this exemplary embodiment, the modified cellulose fiber includes 0.1 mmol/g or more and 3.0 mmol/g or less, preferably 0.4 mmol/g or more and 2.0 mmol/g or less, and more preferably 1.0 mmol/g or more and 1.7 mmol/g or less of a carboxy group or a metal salt thereof. An amount of the carboxy group of the modified cellulose fiber or a metal salt thereof can be adjusted by adjusting the amount of oxidant used, the reaction temperature of the oxidation reaction, reaction time of the oxidation reaction, or the like, when the modified cellulose fiber is produced by oxidizing a cellulose fiber (raw material).

The amount of the carboxy group or a metal salt thereof in the modified cellulose fiber can be measured by titration. A specific measurement method is described below. Note here that in the following method, a salt of a carboxy group is converted into a carboxy group by addition of hydrochloric acid. In other words, the amount of the metal salt of the carboxy group is measured in a form in which it is included in the amount of the carboxy group.

<Measurement Method of Content of Carboxy Group>

A modified cellulose fiber with dry mass of 0.5 g is put into a 100-mL beaker, ion exchanged water is added thereto, so that a volume of a dispersion liquid of the modified cellulose fiber is adjusted to 55 mL. Subsequently, 5 mL of 0.01 M sodium chloride aqueous solution is added into the beaker. The dispersion liquid is stirred such that the modified cellulose fiber is sufficiently dispersed. To this dispersion liquid, 0.1 M hydrochloric acid is added such that pH is adjusted to 2.5 or more and 3 or less, 0.05 M sodium hydroxide aqueous solution is dropped thereto using an automatic titration device, and values of the electric conductivity and pH are measured. Measurement is continued until pH becomes about 11, and an electric conductivity curve is obtained. From this electric conductivity curve, a sodium hydroxide titration amount is obtained, and from the following formula:

Carboxy group content (mmol/g)=Sodium hydroxide titration amount×Sodium hydroxide aqueous solution concentration (0.05 M)/mass of cellulose fiber (0.5 g), the carboxy group content in the modified cellulose fiber is calculated.

When the amount of a carboxy group or a metal salt in the modified cellulose fiber is in the above-mentioned range, a dispersion liquid including a (A) fiber material dispersed satisfactorily and stably can be easily prepared. Furthermore, when the amount of the carboxy group or the metal salt of the modified cellulose fiber is larger, a porous film having a large average pore diameter tends to be easily formed.

A method for preparing a modified cellulose fiber by oxidizing a cellulose fiber is not particularly limited, and any well-known methods for oxidizing cellulose can be appropriately selected as long as the method can oxidize the position C6 of cellulose. Furthermore, the modification by oxidation may be carried out with respect to cellulose fiber singly, or with respect to a mixture of cellulose fiber and other fiber.

Cellulose fiber subjected to modification by oxidation preferably includes a type I crystal structure. Whether the cellulose fiber has the type I crystal structure can be determined based on, for example, the presence of two typical peaks in the vicinity of $2\Theta=14°$ or more and $17°$ or less, and in the vicinity of $2\Theta=22°$ or more and $23°$ or less in a diffraction profile obtained by wide angle X-ray diffraction pattern measurement.

The cellulose fiber may be natural cellulose isolated from a natural product or synthetic cellulose that has been chemically synthesized. However, natural cellulose is preferable because it is inexpensive and easily available in large quantities. The natural cellulose is isolated from gel and the like produced by, for example, plants, animals, and bacteria. Specific examples of the natural cellulose include cellulose isolated from softwood pulp, hardwood pulp, non-wood pulp, bacteria cellulose (BC), and Hoya, cellulose isolated from seaweed, and the like. Examples of the non-wood pulp include a cotton pulp (for example, cotton linter, cotton lint, etc.), straw pulp, bagasse pulp, and the like. These may be used in combination of two or more. Among these, softwood pulp, hardwood pulp, non-wood pulp such as a cotton linter, a cotton lint, straw pulp, and bagasse pulp, are preferable.

The natural cellulose fiber may be subjected to treatment for increasing the surface area, for example, beating, for the purpose of enhancing the reaction efficiency in oxidative modification. Furthermore, it is also preferable to use a natural cellulose fiber that has been stored in a wet state without being dried after isolation and purification from a natural product. When such a cellulose fiber is used, it is in a state in which bundles of microfibrils easily swell, thereby improving reaction efficiency in the oxidative modification and easily making cellulose fibers finer in preparation of the dispersion liquid. In addition, the natural cellulose fiber may be a dissolving pulp that has been subjected to purification for decreasing lignin, hemicellulose, and the like, by a well-known method. Furthermore, it is also preferable to use cellulose that has been highly purified to such a degree as to be used for producing filter paper that conforms to the JIS standard (JIS P 3801: 1995, filter paper (for chemical analysis)), as a cellulose fiber that is subjected to modification. Note here that the thermogravimetric reduction curve obtained by thermogravimetry (TG) can be considered as an index of the degree of purification of the cellulose fiber as a raw material. More specifically, in a cellulose fiber to be modified, when thermogravimetry is carried out under conditions in which the starting temperature is room temperature (20° C.) and a temperature increasing speed is 10° C./min, the weight reduction rate at a time point when the temperature reaches 300° C. is 10% or less (more preferably 8% or less, and further preferably 6% or less), and the weight reduction rate at a time point when the temperature reaches 350° C. is 80% or more (more preferably 82% or more, and further preferably 85% or more). In this way, a cellulose fiber having specific weight reduction behavior is preferably used in this exemplary embodiment.

Examples of the method of modification by oxidation include a method of carrying out oxidation with $N_2O_4$ in a state in which cellulose is dispersed in a solvent such as chloroform, and a method of dissolving cellulose in a high-concentration phosphoric acid aqueous solution and carrying out oxidation with a nitrite salt. According to these methods, oxidation at the position C6 of cellulose produces a carboxy group.

However, the above-mentioned methods have problems that the molecular weight of cellulose is reduced, and side reactions such as production of ketones by oxidation at the positions C2 and C3 occur. Preferable examples of a method that does not easily cause such problems include a method of oxidizing the position C6 using 2,2,6,6-tetramethyl-piperidinooxy radical (TEMPO) and an N-oxyl compound such as 4-acetamide TEMPO.

Preferable examples of the method of carrying out oxidation using an N-oxyl compound include a method of dispersing cellulose in a dispersion medium and then carrying out oxidation with the N-oxyl compound and a co-oxidant. In such a method, it is preferable that the oxidation reaction is carried out while pH is kept at 8 or more and 11 or less with the addition of a base such as a sodium hydroxide aqueous solution. Then, a time point at which pH becomes stable even without adding the base can be defined as an index of completion of the oxidation reaction. Note here that the co-oxidant oxidizes the N-oxyl compound to promote the oxidation of the position C6 of cellulose without directly oxidizing cellulose.

The oxidation reaction using an N-oxyl compound proceeds at, for example, about 0° C. or more and 40° C. or less, and can be carried out at about 10° C. or more and 30° C. or less, and preferably around the room temperature of 15° C. or more and 25° C. or less. The reaction time is, for example, 5 hours or less, preferably 4 hours or less, and more preferably 5 minutes or more and 2 hours or less. The solvent to be used for oxidation reaction is not particularly limited, and can be any solvents that are not oxidized by the N-oxyl compound and a co-oxidant. For example, water can be used as a solvent.

Examples of the N-oxyl compound include compounds which include a nitroxy radical generally used as an oxidation catalyst. As the N-oxyl compound, piperidine nitroxy oxyradical is preferable, and 2,2,6,6-tetramethyl-piperidinooxy radical (TEMPO) or 4-acetamide TEMPO is particularly preferable. The amount of the N-oxyl compound to be used may be sufficiently a catalyst amount. The N-oxyl compound is used such that, for example, the concentration in the reaction liquid is preferably 0.1 mmol/L or more and 4 mmol/L or less, and more preferably 0.2 mmol/L or more and 2 mmol/L less.

Suitable examples of the co-oxidant include hypohalous acid, a hypohalous acid salt, halous acid, a halous acid salt, perhalogen acid, a perhalogen acid salt, hydrogen peroxide, perorganic acid, and the like. Among the examples of the above-mentioned co-oxidant, alkali metal salts of hypohalous acids, such as sodium hypochlorite and sodium hypobromite, are preferable.

In order to increase the oxidation reaction speed at the position C6 of cellulose, the oxidation reaction may be carried out in the presence of alkali metal bromides such as sodium bromide. In this case, the amount of the alkali metal bromide to be used is preferably 1 molar time or more and 40 molar times or less, and more preferably 10 molar times or more and 30 molar times or less relative to the number of moles of the N-oxyl compound.

After the oxidation of the position C6 of cellulose is carried out by the above-described method, a part or whole of an aldehyde group and a ketone group included in the oxidized cellulose may be reduced. Such reduction is preferably carried out, for example, in water and under the conditions of about pH 10. As the reducing agent, for example, $LiBH_4$, $NaBH_3CN$, $NaBH_4$, and the like, can be used. $NaBH_4$ is preferable because it is inexpensive and it allows a reduction reaction to proceed preferably. The amount of the reducing agent to be used is preferably 0.1% by mass or more and 4% by mass or less, and more preferably 1% by mass or more and 3% by mass or less, relative to the mass of the oxidized cellulose. The temperature at which the reduction reaction is carried out is not particularly limited, but it is preferably 10° C. or more and 50° C. or less, and more preferably 15° C. or more and 40° C. or less. Also a reduction reaction time is not particularly limited, and it is, for example, 10 min or more and 10 hours or less, and preferably 30 min or more and 2 hours or less. Furthermore, in a stage at which the above-mentioned oxidation reaction is carried out, at least a part of the position C6 of cellulose may form a metal salt. However, the position C6 of cellulose can be converted into a carboxy group (—COOH) by making the reaction solution acidic, as necessary. The degree of conversion into a carboxy group is arbitrary.

The modified cellulose fiber that has been reduced as necessary is used for preparation of a dispersion liquid, as it is or after purification by a method such as washing with water.

<(B) Organic Solvent>

A dispersion liquid includes an (B) organic solvent. Types of the (B) organic solvent are not particularly limited as long as a dispersion liquid including a (A) fiber material dispersed desirably can be prepared. The dispersion liquid may include two types or more of organic solvents in combination as the (B) organic solvent.

The boiling point of the (B) organic solvent is preferably 70° C. or more and 250° C. or less, more preferably 90° C. or more and 200° C. or less, and particularly preferably 110° C. or more and 150° C. or less. When the (B) organic solvent displaying a boiling point in such a range is used, excessive change of composition of the dispersion liquid due to the volatilization of the (B) organic solvent does not easily occur. Thus, the dispersion state of the (A) fiber material in the dispersion liquid becomes stable. Furthermore, the (B) organic solvent can be easily removed from the coating film when a porous film is formed. Note here that the boiling point of the (B) organic solvent is a boiling point under atmospheric pressure.

In the Hansen solubility parameters for the (B) organic solvent, when a term of energy by dipolar interaction is represented by $\delta p$ [unit: $(MPa)^{0.5}$] and a term of energy by hydrogen bonding is represented by $\delta h$ [unit: $(MPa)^{0.5}$], a value of $(\delta p^2 + \delta h^2)^{0.5}$ is preferably 9.0 $(MPa)^{0.5}$ or more, more preferably 10.0 $(MPa)^{0.5}$ or more, particularly preferably 12.0 $(MPa)^{0.5}$ or more, and most preferably 13.0 or more. When the value of $(\delta p^2 + \delta h^2)^{0.5}$ of the (B) organic solvent is in the above-mentioned range, the (A) fiber material can be easily dispersed in the dispersion liquid satisfactorily and stably, and a porous film having an opening with a desired pore diameter can be easily formed. This is assumed to be because of the following reasons. The value of $(\delta p^2 + \delta h^2)^{0.5}$ corresponds to the size of a synthesis vector of a vector of $\delta p$ whose starting point is an origin of the Hansen space, and a vector of $\delta h$ whose starting point is an origin of the Hansen space. Herein, the modified cellulose fiber abundantly includes hydroxyl groups or carboxy groups capable of easily forming hydrogen bonding. Furthermore, the modified cellulose fiber includes an easily polarizable O—H bond, C—O bond, or a carboxy group. Therefore, in order to satisfactorily disperse the (A) fiber material including the modified cellulose fiber, dipolar interaction and interaction by the hydrogen bonding are important. Therefore, as to the (B) organic solvent, when the size of synthesized vector of a vector of $\delta p$ as a term of energy by the dipolar interaction and a vector of $\delta h$ as a term of energy by the hydrogen bonding is large, the (A) fiber material including modified cellulose fiber is considered to be easily dispersed.

The upper limit value of the value of $(\delta p^2 + \delta h^2)^{0.5}$ is not particularly limited. From the viewpoint that a porous film having an opening with a desired pore diameter is easily formed, the value of $(\delta p^2 + \delta h^2)^{0.5}$ is preferably 40.0 $(MPa)^{0.5}$ or less, and more preferably 30.0 $(MPa)^{0.5}$ or less.

As the (B) organic solvent, for example, glycol, glycol monoalkyl ether, glycol alkyl ether acetate, lactone, linear or cyclic ketone, alkane monool, and an aprotic polar solvent can be preferably used.

Suitable specific examples of the (B) organic solvent include glycols such as ethylene glycol, propylene glycol, diethylene glycol, dipropylene glycol (DPG), triethylene glycol, and tripropylene glycol; glycol monoalkyl ethers such as ethylene glycol monomethyl ether, ethylene glycol monoethyl ether, ethylene glycol mono n-propyl ether, propylene glycol monomethyl ether (PGME), propylene glycol monoethyl ether, propylene glycol mono n-propyl ether, diethylene glycol monomethyl ether, diethylene glycol monoethyl ether, diethylene glycol mono n-propyl ether, dipropylene glycol monomethyl ether (MFDG), dipropylene glycol monoethyl ether, dipropylene glycol mono n-propyl ether, triethylene glycol monomethyl ether, triethylene glycol monoethyl ether, triethylene glycol mono n-propyl ether, tripropylene glycol monomethyl ether (MFTG), tripropylene glycol monoethyl ether, and tripropylene glycol mono n-propyl ether; glycol alkyl ether acetates such as 3-methoxy butyl acetate (MA), ethylene glycol monomethyl ether acetate, ethylene glycol monoethyl ether acetate, ethylene glycol mono n-propyl ether acetate, propylene glycol monomethyl ether acetate (PGMEA), propylene glycol monoethyl ether acetate, propylene glycol mono n-propyl ether acetate, diethylene glycol monomethyl ether acetate, diethylene glycol monoethyl ether acetate, diethylene glycol mono n-propyl ether acetate, dipropylene glycol monomethyl ether acetate (DPMA), dipropylene glycol monoethyl ether acetate, dipropylene glycol mono n-propyl ether acetate, triethylene glycol monomethyl ether acetate, triethylene glycol monoethyl ether acetate, triethylene glycol mono n-propyl ether acetate, tripropylene glycol monomethyl ether acetate, tripropylene glycol monoethyl ether acetate, and tripropylene glycol mono n-propyl ether acetate; lactones such as γ-butyrolactone (GBL), α-methyl-γ-butyrolactone, γ-valerolactone, γ-caprolactone, γ-laurolactone, δ-valerolactone, and hexano lactone; linear or cyclic ketones such as methyl ethyl ketone, diethyl ketone, 2-pentanone, 2-hexanone, 3-hexanone, methyl isobutyl ketone, acetylacetone, cyclopentanone, cyclohexanone, and cycloheptanone; alkane monools such as methanol, ethanol, n-propanol, isopropanol, n-butyl alcohol, isobutyl alcohol, sec-butyl alcohol, tert-butyl alcohol, n-pentyl alcohol, n-hexyl alcohol, cyclohexyl alcohol, and n-heptyl alcohol; aprotic polar solvents such as N,N-dimethylformamide (DMF), N,N-diethylformamide, N,N-dimethylacetamide (DMAc), N,N-diethylacetamide, N-methyl-2-pyrrolidone, N-ethyl-2-pyrrolidone, N,N,N',N'-tetramethylurea (TMU), N,N,N',N'-tetraethylurea, N-methyl caprolactam, 1,3-dimethyl-2-imidazolidinone (DMI), dimethyl sulfoxide, hexamethyl phosphoric triamide, and acetonitrile.

Among the preferable specific examples mentioned above, particularly preferable (B) organic solvents, together with values of $\delta p$, $\delta h$, and $(\delta p^2 + \delta h^2)^{0.5}$, are shown in the Table below.

TABLE 1

| | $\delta p$ Unit: $(MPa)^{0.5}$ | $\delta h$ Unit: $(MPa)^{0.5}$ | $(\delta p^2 + \delta h^2)^{0.5}$ Unit: $(MPa)^{0.5}$ |
|---|---|---|---|
| Propylene glycol monomethyl ether | 6.3 | 11.6 | 13.2 |
| Isopropanol | 6.1 | 16.4 | 17.5 |
| n-butyl alcohol | 5.7 | 15.8 | 16.8 |
| γ-butyrolactone | 16.6 | 7.4 | 18.2 |
| Cyclohexanone | 4.1 | 13.5 | 14.1 |
| Methyl ethyl ketone | 9 | 5.1 | 10.3 |
| 3-methoxy butyl acetate | 4.1 | 8.1 | 9.1 |
| Propylene glycol monomethyl ether acetate | 5.6 | 9.8 | 11.3 |
| N-methyl-2-pyrrolidone | 12.3 | 7.2 | 14.3 |
| Dimethyl sulfoxide | 16.4 | 10.2 | 19.3 |
| N,N-dimethylacetamide | 11.5 | 9.4 | 14.9 |
| Ethylene glycol | 11 | 26 | 28.2 |

The amount of the (B) organic solvent to be used is not particularly limited, and it can be appropriately determined in consideration of the viscosity of a dispersion liquid, coating characteristics of the dispersion liquid, an amount of water in the dispersion liquid, and the like. Typically, the amount of the (B) organic solvent to be used is determined such that the solid content concentration of the dispersion liquid is 0.1% by mass or more and 10% by mass or less, and preferably 0.5% by mass or more and 3% by mass or less.

<Water>

The dispersion liquid may include water, but the amount of the water is limited to 5% by mass or less with respect to the total amount of the dispersion liquid. When the water content in the dispersion liquid is 5% by mass or less, it is possible to achieve both the desired porosity and the desired average pore diameter in a porous film formed using the dispersion liquid. The amount of water in the dispersion liquid is preferably 3% by mass or less, more preferably 1% by mass or less, particularly preferably 0.5% by mass or less, and most preferably 0.1% by mass or less with respect to the total amount of the dispersion liquid. The water content is preferably as small as possible. It is inconvenient that the water content in the dispersion liquid is excessive, concerning the point that in order to form a porous film that achieves both the desired porosity and the desired average pore diameter, it is necessary to dry a coating film immediately after the coating film is formed, or to carry out management that requires strict temperature conditions in formation of a porous film. This water content can be measured by a well-known method such as the Karl Fischer method.

<Other Components>

A dispersion liquid may include other components other than the (A) fiber material and the (B) organic solvent described above within a range where the objects of the present invention are not impaired. Examples of the other components include a surfactant, a defoaming agent, a leveling agent, and the like.

<Preparation Method of Dispersion Liquid>

A dispersion liquid is prepared by mixing a (A) fiber material, an (B) organic solvent, and water and other components as necessary. The (A) fiber material may be used in a solid state, or in a state dispersed in a dispersion medium. Because the (A) fiber material can be easily dispersed in the dispersion liquid, the (A) fiber material is preferably used in a state dispersed in a dispersion medium.

When the (A) fiber material is in a solid state, a dispersion liquid can be prepared by mixing the solid-state (A) fiber material and a desired amount of the (B) organic solvent with each other. In order to finely disperse the (A) fiber material to a desired degree in the dispersion liquid, usually, the (A) fiber material and the (B) organic solvent are mixed with each other and then dispersion treatment is carried out. When the (A) fiber material is dispersed in a water-containing medium, the water-containing medium needs to be substituted with the (B) organic solvent until the water content in the dispersion liquid becomes 5% by mass or less. Examples of the method of substituting the water-containing medium with the (B) organic solvent include a method of removing by evaporation of a part or whole of the water-containing medium, and then adding the (B) organic solvent, a method of precipitating the (A) fiber material in a vessel by a centrifugal separator, discarding a supernatant containing water, and then dispersing the (A) fiber material precipitated in the (B) organic solvent, a method of filtering the (A) fiber material through a filter, and washing with the (B) organic solvent, followed by dispersion again, and the like.

It is preferable that dispersion treatment is carried out by mixing the (A) fiber material and the (B) organic solvent with each other by the methods mentioned above. Suitable examples of a dispersing device to be used for the dispersion treatment include a ball mill, a bead mill, a sand mill, a double roll mill, a triple roll mill, a roll mill, a colloid mill, a jet mill, a kneader, a homogenizer, and the like. Note here that by adjusting the dispersion conditions, a particle diameter (a dispersion diameter, a volume average particle diameter), and distribution of a particle diameter of the (A) fiber material in the dispersion liquid can be adjusted.

<<Porous Film>>

A porous film is a film obtained by drying the coating film including the above-described dispersion liquid. A dispersion liquid as a material for forming the porous film is as mentioned above, and a formation method of the porous film is as described for the dispersion liquid.

The porosity of the porous film is not particularly limited, and it can be appropriately determined in consideration of applications of use of the porous film. When a porous film is used as a separator of a power storage element, the porosity of the porous film is preferably 20% by volume or more and 80% by volume or less, more preferably 30% by volume or more and 70% by volume or less, and particularly preferably 35% by volume or more and 60% by volume or less because, for example, ions such as a lithium ion can be allowed to move satisfactorily in the porous film, and mechanical strength of the porous film is satisfactory. The porosity can be adjusted by adjusting a dispersion diameter of a (A) fiber material in the dispersion liquid, a solid content concentration of a dispersion liquid, drying conditions of a coating film when a porous film is formed, and the like. Note here that the porosity of the porous film can be measured by a mercury porosimeter.

The average pore diameter of the porous film is not particularly limited, and can be appropriately determined in consideration of applications of use of the porous film. From the viewpoint of balance between ionic permeability and a risk of short-circuit, the average pore diameter of the porous film is preferably 0.02 µm or more and 0.18 µm or less, more preferably 0.02 µm or more and 0.15 µm or less, and particularly preferably 0.02 µm or more and 0.10 µm or less. The average pore diameter of the porous film can be adjusted by adjusting the amount of a carboxy group or a metal salt thereof in a modified cellulose fiber, a dispersion diameter of a (A) fiber material in the dispersion liquid, a solid content concentration of a dispersion liquid, and drying conditions of a coating film when a porous film is formed, and the like. Note here that the average pore diameter of a porous film can be measured by a mercury porosimeter.

A film thickness of the porous film is not particularly limited, and can be appropriately determined in consideration of applications of use of the porous film. When the porous film is used as a separator of a power storage element, it is preferable that the porous film is as thin as possible because high-speed charging can be carried out, and a power storage element having high capacity can be easily produced. Specifically, a film thickness of the porous film is preferably 1 µm or more and 100 µm or less, and more preferably 2 µm or more and 50 µm or less.

A shape of the porous film is not particularly limited. As mentioned above, the dispersion liquid is applied, and then a coating film is dried so as to form a porous film. Accordingly, porous films having any shapes following shapes of surfaces of a coating subject can be produced.

As mentioned above, the above-described porous film is particularly preferably used as a separator of a power storage element.

<<Method for Producing Porous Film>>

A Method for producing a porous film includes:
a step of oxidizing a (A') fiber material including a cellulose fiber so as to prepare a modified cellulose fiber in which at least a part of the cellulose fiber is oxidized;
a step of preparing a dispersion liquid by mixing a (A) fiber material including the modified cellulose fiber and an (B) organic solvent with each other;
a step of applying a dispersion liquid to a base material so as to form a coating film; and
a step of drying the coating film so as to form a porous film. Note here that a non-modified cellulose fiber material to be subjected to oxidative modification is defined as "a (A') fiber material". Details of each of the steps are as mentioned above. Furthermore, detailed configurations of the dispersion liquid and the modified cellulose fiber are as mentioned above. As a base material to which the dispersion liquid is applied, an electrode, and more particularly, an electrode for a power storage element is suitably used.

<<Power Storage Element>>

A power storage element may have a conventionally known configuration of a power storage element except that a separator including the above-mentioned porous film is provided. The separator including the porous film constitutes one element of a power storage element as, for example, an electrode composite composed with an electrode.

Examples of the power storage element include batteries or capacitors, such as a lithium ion secondary battery, a polymer-lithium battery, an aluminum electrolytic condenser (capacitor), an electric double-layer capacitor, a lithium ion capacitor, and the like. The separator including a porous film is used preferably for a secondary battery, and more preferably for a lithium ion secondary battery. Preferable examples of the power storage element mentioned above include a lithium battery or a lithium ion battery.

A configuration of the power storage element may be the same as that of a conventional battery except that a separator and an electrode, preferably an electrode composite of the separator and the electrode, are used as a single battery layer. Note here that a structure of the power storage element is not particularly limited, and may be a laminated type, a cylindrical type, a prismatic shaped type, a coin type, and the like. For example, a lithium ion secondary battery as a power storage element includes a unit cell layer in which a porous film (separator) in an electrode composite is impregnated with an electrolytic solution.

Furthermore, a capacitor as a power storage element, for example, an electric double-layer capacitor, may have a unit cell in which a porous film (separator) in an electrode composite is impregnated with an electrolytic solution.

A lithium ion secondary battery or an electric double-layer capacitor can be manufactured by, for example, laminating or winding a plurality of unit cell layers or unit cells to form an element, then, housing the element in an outer package material, connecting a current collector to an outer electrode, and impregnating with a conventionally known electrolytic solution, followed by sealing the outer package material.

EXAMPLES

The present invention will now be more specifically described with reference to Examples, but the scope of the present invention is not limited to the following examples.

Preparation Example 1

Fifty grams of filter paper (5C) manufactured by Advantec Co., Ltd. was dispersed in water while dissolving fibers. To the obtained dispersion liquid, 1.00 g of TEMPO, 20.00 g of sodium bromide, and sodium hypochlorite being 1.0 equivalent to the converted value of primary alcohol included in cellulose were added. Thereafter, a sodium hydroxide aqueous solution was dropped thereto, and the resultant product was stirred at room temperature while pH was maintained at 10.5 to obtain a reaction liquid including a modified cellulose fiber. Note here that hydrochloric acid was added to this reaction liquid until the reaction liquid became acidic, and the end group of the modified cellulose was made to be a carboxy group. Furthermore, an amount of the carboxy group in the modified cellulose fiber was 1.7 mmol/g.

Preparation Example 2

A reaction liquid including a modified cellulose fiber was obtained in the same manner as in Preparation Example 1 except that the amount of sodium hypochlorite used was 0.2 equivalent to the concentration value of primary alcohol included in cellulose. An amount of the carboxy group in the modified cellulose fiber was 1.0 mmol/g.

Example 1

The reaction liquid including a modified cellulose fiber obtained in Preparation Example 1 was filtered through a filter once so as to obtain a wet cake of the modified cellulose fiber. The obtained wet cake was washed with propylene glycol monomethyl ether. The washed modified cellulose fiber was filtered through a filter again, and the modified cellulose fiber remaining on the filter was added to propylene glycol monomethyl ether. The solid content concentration of the liquid herein was about 10% by mass. Propylene glycol monomethyl ether was further added to the liquid including the modified cellulose fiber obtained herein to adjust the solid content concentration to 2% by mass. The liquid including the modified cellulose fiber was subjected to dispersion treatment using a bead mill using beads having a diameter of 0.5 (mm), manufactured by Nikkato Corp., under conditions including a circumferential velocity of 9 m/sec and bead filling rate of 80% for ten minutes to obtain a dispersion liquid whose solid content concentration was adjusted to 2% by mass. The obtained dispersion liquid did not substantially include water. Furthermore, in the obtained dispersion liquid, the modified cellulose fiber was dispersed satisfactorily and stably.

After the obtained dispersion liquid was applied to a copper foil to form a coating film using an applicator, the coating film was dried at 90° C. for 5 minutes to obtain a porous film having a film thickness of 6 μm. The porosity (% by volume) and the average pore diameter (μm) of the obtained porous film were measured with a mercury porosimeter. The porosity and the average pore diameter of the porous film are shown in Table 2.

Example 2

A dispersion liquid was obtained in the same manner as in Example 1 except that the reaction liquid including a modified cellulose fiber obtained in Preparation Example 2 was used. In the obtained dispersion liquid, the modified cellulose fiber was dispersed satisfactorily and stably. A porous film was formed in the same manner as in Example 1 using the obtained dispersion liquid. The porosity and the average pore diameter of the porous film of Example 2 are shown in Table 2.

Example 3

A dispersion liquid was obtained in the same manner as in Example 1 except that when the solid content concentration of the dispersion liquid was adjusted, water in an amount equivalent to 5% by mass with respect to the dispersion liquid was added to the dispersion liquid. In the obtained dispersion liquid, the modified cellulose fiber was dispersed satisfactorily and stably. A porous film was formed in the same manner as in Example 1 using the obtained dispersion liquid. The porosity and the average pore diameter of the porous film of Example 3 are shown in Table 2.

Example 4

A dispersion liquid was obtained in the same manner as in Example 1 except that a reaction liquid including a modified cellulose fiber obtained in Preparation Example 2 was used, and the time of dispersion treatment was changed to 6 minutes. In the obtained dispersion liquid, the modified cellulose fiber was dispersed satisfactorily and stably. A porous film was formed using the obtained dispersion liquid in the same manner as in Example 1 except that application was carried out using a spray coater. The porosity and the average pore diameter of the porous film of Example 4 are shown in Table 2.

Example 5

A dispersion liquid was obtained in the same manner as in Example 1 except that a reaction liquid including a modified cellulose fiber obtained in Preparation Example 2 was used, a mixture solvent including propylene glycol monomethyl ether and N-methyl-pyrrolidone in a ratio of 9:1 (mass ratio) was employed as an organic solvent, and the time of dispersion treatment was changed to 5 minutes. In the obtained dispersion liquid, the modified cellulose fiber was dispersed satisfactorily and stably. A porous film was formed in the same manner as in Example 1 using the obtained dispersion liquid. The porosity and the average pore diameter of the porous film of Example 5 are shown in Table 2.

Comparative Example 1

A dispersion liquid was obtained in the same manner as in Example 1 except that a reaction liquid including a modified cellulose fiber obtained in Preparation Example 1 was used, and when the solid content concentration of the dispersion liquid was adjusted, water in an amount equivalent to 10% by mass with respect to the dispersion liquid was added to the dispersion liquid. In the obtained dispersion liquid, the modified cellulose fiber was dispersed satisfactorily and stably. A porous film was formed in the same manner as in Example 1 using the obtained dispersion liquid. The porosity and the average pore diameter of the porous film of Comparative Example 1 are shown in Table 2.

TABLE 2

|  | Carboxy group content in modified cellulose fiber (mmol/g) | Dispersion time (minute(s)) | Water content in dispersion liquid (% by mass) | Application method | Porosity (% by volume) | Average pore diameter (μm) |
| --- | --- | --- | --- | --- | --- | --- |
| Example1 | 1.7 | 10 | 0 | Applicator | 38.8 | 0.06 |
| Example2 | 1.0 | 10 | 0 | Applicator | 36.8 | 0.09 |
| Example3 | 1.7 | 10 | 5 | Applicator | 47.8 | 0.03 |
| Example4 | 1.0 | 6 | 0 | Spray | 35.0 | 0.34 |
| Example5 | 1.0 | 5 | 0 | Applicator | 15.0 | 0.20 |
| Comparative Example1 | 1.7 | 10 | 10 | Applicator | 3.5 | Less than 0.01 |

From Examples 1 to 5, it is shown that in a dispersion liquid including a (A) fiber material and an (B) organic solvent, when the (A) fiber material includes a modified cellulose fiber which includes a carboxy group in an amount within a range of 0.1 mmol/g or more and 3.0 mmol/g or less and which has undergone oxidative modification and when the amount of water in the dispersion liquid is 5% by mass or less, the (A) fiber material is dispersed in the dispersion liquid satisfactorily and stably, and a porous film having high porosity can be formed. Note here that in Examples 1 to 5 and the below-mentioned Examples 6 and 7, the viscosity at 20° C. was 5 cp or more and 500 cp or less, and handling property in obtaining the coating film was excellent.

On the other hand, from Comparative Example 1, it is shown that when the (A) fiber material includes a modified cellulose fiber which includes a carboxy group in an amount within a range of 0.1 mmol/g or more and 3.0 mmol/g or less and which has undergone oxidative modification, and meanwhile, the amount of water in the dispersion liquid exceeds 5% by mass, the (A) fiber material can be dispersed in the dispersion liquid satisfactorily and stably, but a porous film having high porosity is not easily formed.

Example 1, Example 6 and Comparative Example 7

A dispersion liquid of Example 6 was obtained in the same manner as in Example 1 except that the solvent was changed from propylene glycol monomethyl ether to isopropanol. Furthermore, a dispersion liquid of Example 7 was obtained in the same manner as in Example 1 except that propylene glycol monomethyl ether was changed to γ-butyrolactone. In the obtained dispersion liquid of Examples 1, 6, and 7, the modified cellulose fiber was dispersed satisfactorily and stably. The volume average particle diameter and the zeta potential of the surface of the modified cellulose fiber in the dispersion liquid of Examples 1, 6, and 7 were measured. These measurement results are shown in Table 3. These dispersion liquids of Examples 1, 6, and 7 also have dispersion stability similar to the dispersion liquid of Examples 1 to 5 mentioned above, to give a porous film having appropriate pores by applying and drying.

TABLE 3

| | (B) Organic solvent | Carboxy group content in modified cellulose fiber (mmol/g) | Dispersion time (minute(s)) | Water content in dispersion liquid (% by mass) | Volume average particle diameter (μm) | Zeta potential (mV) |
|---|---|---|---|---|---|---|
| Example1 | Propylene glycol monomethyl ether | 1.7 | 10 | 0 | 9.0 | −54.3 |
| Example6 | Isopropanol | 1.7 | 10 | 0 | 11.3 | −55.4 |
| Example7 | γ-butyrolactone | 1.7 | 10 | 0 | 7.8 | −33.2 |

What is claimed is:

1. A method for producing a porous film, the method comprising:
    oxidizing a (A') fiber material including a cellulose fiber so as to prepare a modified cellulose fiber in which at least a part of the cellulose fiber is oxidized;
    preparing a dispersion liquid by mixing a (A) fiber material including the modified cellulose fiber and (B) an organic solvent with each other;
    applying the dispersion liquid to a base material so as to form a coating film; and
    drying the coating film so as to form a porous film,
    wherein the modified cellulose fiber includes 0.1 mmol/g or more and 3.0 mmol/g or less of a carboxy group or a metal salt thereof, and
    an amount of water with respect to the total amount of the dispersion liquid is 5% by mass or less wherein the porous film has a porosity from 15% by volume or more and 80% by volume or less and an average pore diameter of from 0.02 microns or more and 0.34 microns or less.

2. The method for producing a porous film according to claim 1, wherein the base material is an electrode.

3. The method for producing a porous film according to claim 1, wherein in the Hansen solubility parameters for the (B) organic solvent, when a term of energy by dipolar interaction is represented by δp [unit: (MPa)$^{0.5}$] and a term of energy by hydrogen bonding is represented by δh [unit: (MPa)$^{0.5}$], a value of (δp$^2$+δh$^2$)$^{0.5}$ is 9.0 (MPa)$^{0.5}$ or more.

4. The method for producing a porous film according to claim 1, wherein a boiling point of the (B) organic solvent is 70° C. or more and 250° C. or less.

5. The method for producing a porous film according to claim 1, wherein when the (A) fiber material is subjected to thermogravimetry under conditions in which a starting temperature is room temperature (20° C.) and a temperature increasing speed is 10° C./min, a weight reduction rate at a time point when temperature reaches 190° C. is 10% or less, and a weight reduction rate at a time point when temperature reaches 340° C. is 65% or more.

6. The method for producing a porous film according to claim 1, wherein viscosity of the dispersion liquid at room temperature (20° C.) is 5 cp or more and 500 cp or less.

7. The method for producing a porous film according to claim 1, wherein a volume average particle diameter of the (A) fiber material in the dispersion liquid is 5 μm or more and 100 μm or less.

8. The method for producing a porous film according to claim 1, wherein a zeta potential of a surface of the (A) fiber material in the dispersion liquid is −80 mV or more and −20 mV or less.

9. The method for producing a porous film according to claim 1, wherein the porous film is a separator of a power storage element.

10. A method for manufacturing a power storage element including an electrode and a porous film, the method comprising providing the electrode and producing a porous film according to the method of claim 1, thereby producing the power storage element.

11. The method for manufacturing a power storage element according to claim 10, wherein the power storage element is a secondary battery.

12. The method for manufacturing a power storage element according to claim 10, wherein the power storage element is a lithium battery or a lithium ion battery.

* * * * *